United States Patent
Hojo

[15] 3,701,200
[45] Oct. 31, 1972

[54] GYROSCOPIC INSTRUMENT
[72] Inventor: Takeshi Hojo, Fujisawa, Japan
[73] Assignee: Kabushikikaisha Tokyo Keiki Seizosho, Tokyo, Japan
[22] Filed: April 8, 1970
[21] Appl. No.: 26,640

[30] Foreign Application Priority Data
April 15, 1969  Japan ..................... 44/29579

[52] U.S. Cl. .................................... 33/321, 74/5.34
[51] Int. Cl. ........................................... G01c 19/38
[58] Field of Search ............................... 33/226 Z

[56] References Cited
UNITED STATES PATENTS

| | | |
|---|---|---|
| 2,902,772 | 9/1959 | Ciscel..................... 33/226 Z |
| 3,232,103 | 2/1966 | Schneider............. 33/226 Z X |
| 2,953,926 | 9/1960 | Wrigley et al. ....33/226 Z UX |
| 3,104,545 | 9/1963 | Draper et al.......33/226 Z UX |
| 3,220,266 | 11/1965 | Jurman et al.........33/226 Z X |

Primary Examiner—Robert B. Hull
Attorney—Hill, Sherman, Meroni, Gross & Simpson

[57] ABSTRACT

A gyroscopic instrument having a gyro platform pivotable about three shafts perpendicular to one another and defining a plane stable relative to inertial space and including means for holding the first shaft of the gyro platform substantially horizontal and means for generating a signal corresponding to the differential with respect to time of inclination of the gyro platform about the first shaft relative to a horizontal plane, and means for causing the gyro platform to rotate about a shaft perpendicular to the first shaft in response to the signal from the signal generating means.

1 Claim, 9 Drawing Figures

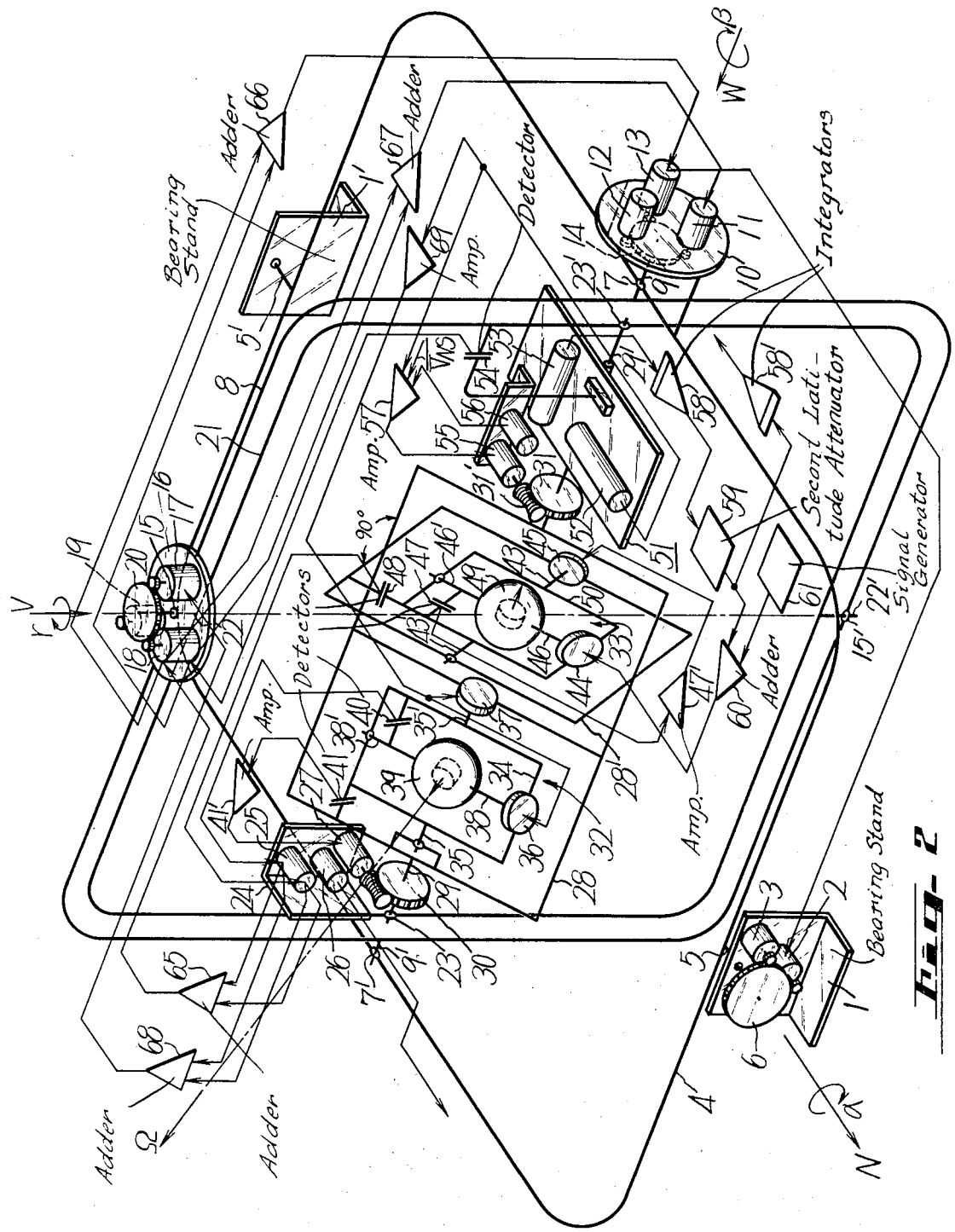

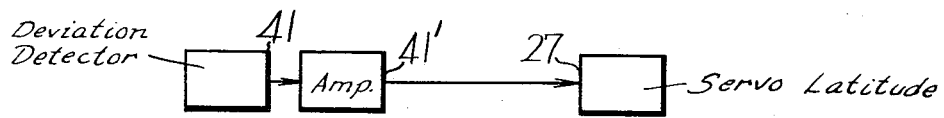
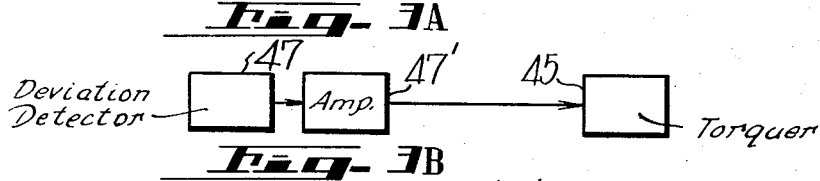
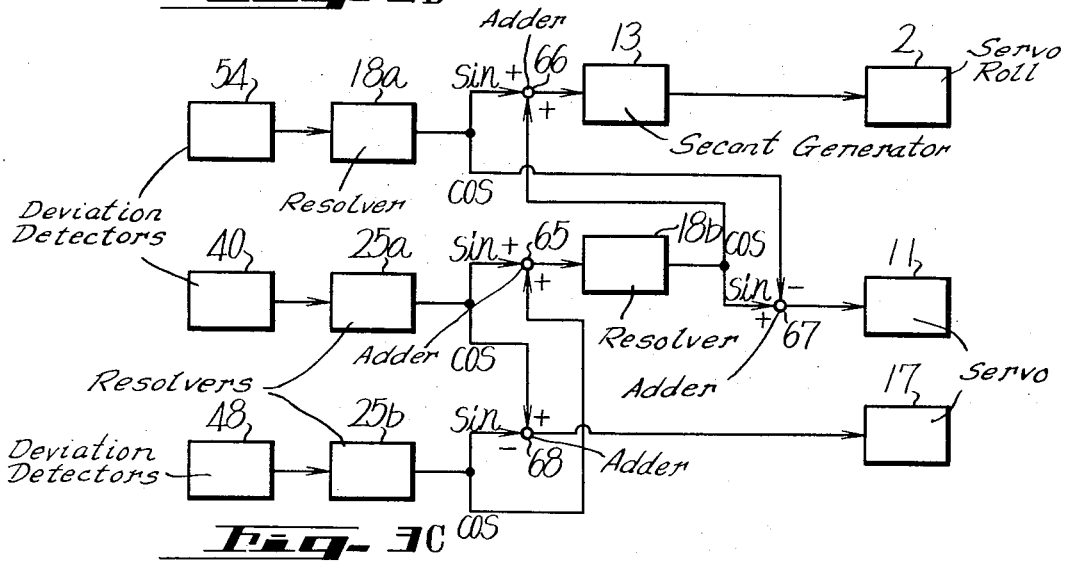
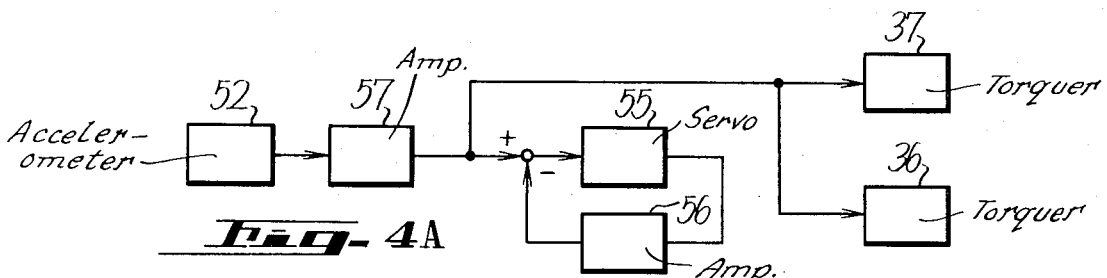
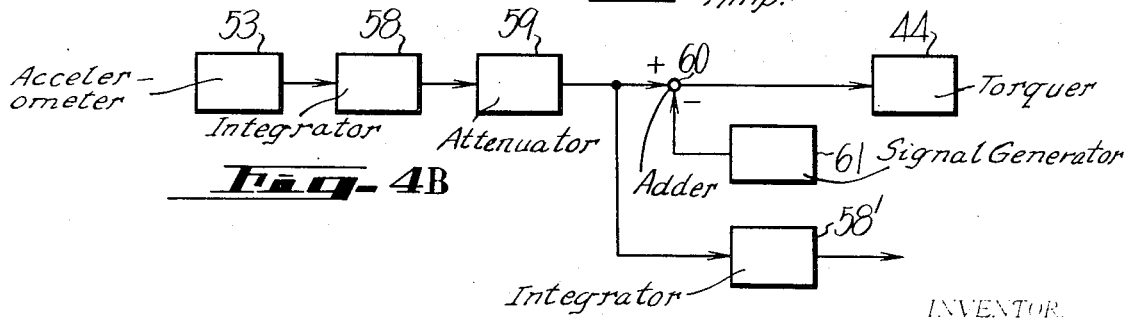

INVENTOR.
Takeshi Hojo

GYROSCOPIC INSTRUMENT

CROSS-REFERENCE TO RELATED APPLICATION

This invention relates to an improvement in or relating to a gyroscopic instrument disclosed in the copending U.S. Pat. application, Ser. No. 695,127 filed Jan. 2, 1968 by the same assignee of this application now U.S. Pat. No. 3,596,366 which issued Aug. 3, 1971.

BACKGROUND OF THE INVENTION

1. Field of the Invention

This invention relates to a gyroscopic instrument for use with ships or other craft, and more particularly to an integrated navigation instrument which indicates azimuth as a gyrocompass and also indicates the latitude and longitude of the craft as well as the roll and pitch angles.

2. Description of the Prior Art

An inertial navigation instrument has heretofore been proposed for use with ships for detecting and indicating their location. However, the prior instrument is expensive and complex and is difficult to operate and maintain and is not suitable for general use.

SUMMARY OF THE INVENTION

The primary object of this invention is to provide an inexpensive, simple, easy-to-operate high precision gyroscopic instrument which is capable of continuous detection and indication of the latitude and longitude of ships or other craft.

Another object of this invention is to provide a gyroscopic instrument for determining azimuth with a precision higher than possible with gyrocompasses now in use.

Other objects, features and advantages of this invention will become apparent from the following description taken in conjunction with the accompanying drawings.

BRIEF DESCRIPTION OF THE DRAWINGS

FIG. 2 is a schematic diagram illustrating one example of an instrument of this invention;

FIGS. 3A, 3B and 3C are block diagrams for explaining the operation of a control unit of the instrument exemplified in FIG. 2;

FIGS. 4A and 4B are block diagrams for explaining the operation of a control system of the instrument of this invention;

DESCRIPTION OF THE PREFERRED EMBODIMENTS

Figure 1:
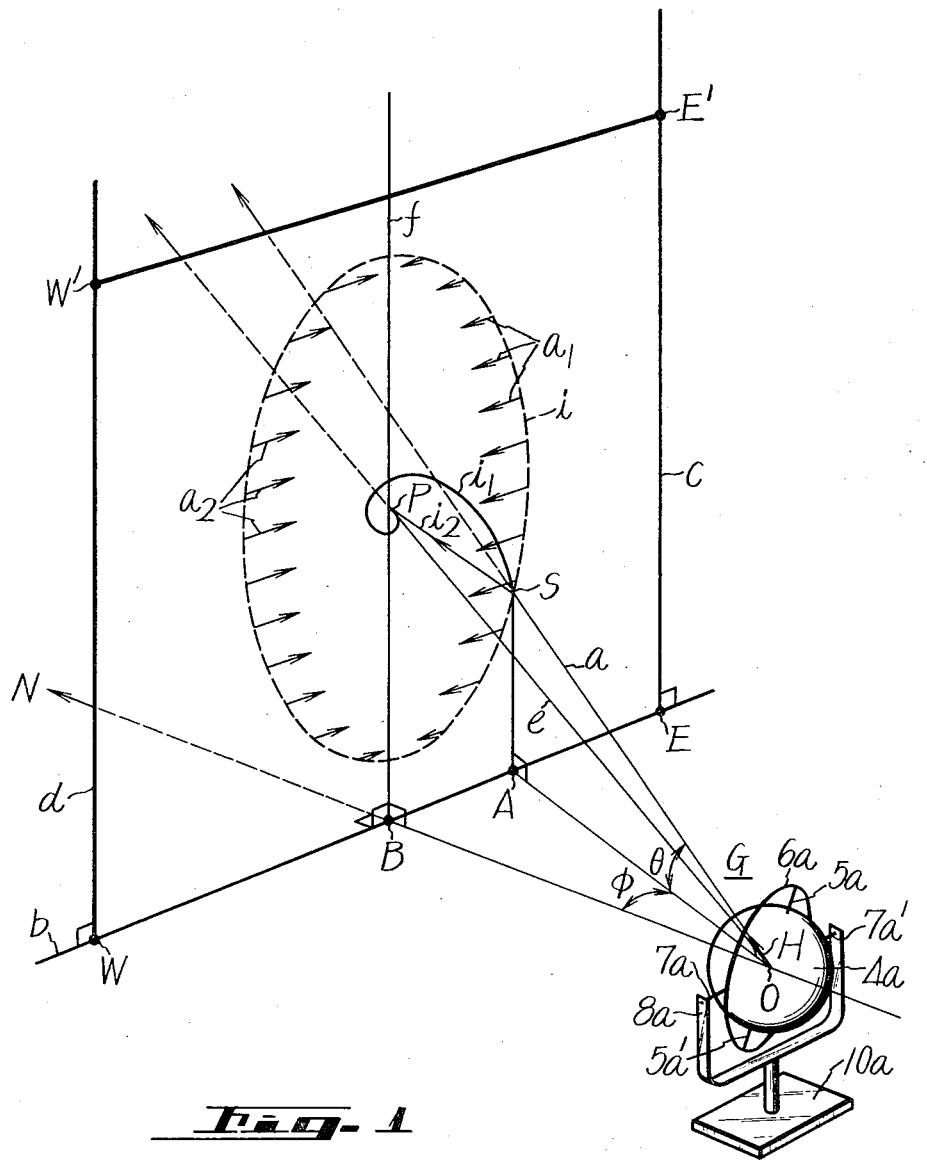
FIG. 1 is a schematic diagram for explaining the principles of the system for detecting the latitude and azimuth which is the principal part of this invention.

In FIG. 1 there is schematically illustrated the latitude and azimuth detecting system which is the principal part of this invention. Reference numeral 4a indicates a gyro case having incorporated therein a gyro rotor, which is mounted on a support base 10a. The rotor is positioned in the gyro case 4a at its center 0 and is driven at high speed. The vector of the angular momentum of the rotor rotated at high speed is indicated by an arrow H. Let it be assumed that the rotor rotates clockwise about its spin axis which is co-extensive with the vector H from the point 0, the clockwise motion (rotation) being viewed from the viewers' side of the gyro assembly as shown in FIG. 1. The gyro case 4a has attached thereto shafts 5a and 5a' which cross the spin axis of the gyro at right angles and the free ends of the shafts 5a and 5a' are supported by a vertical ring 6a to permit rotation of the gyro case 4a about the axis of the shafts 5a and 5a'.

A vertical ring 6a has horizontal shafts 7a and 7a' perpendicular to the shafts 5a and 5a' and the shafts 7a and 7a' are pivoted to a support ring 8a at their free ends, which as shown may have a substantially U-shaped configuration. The vertical ring 6a is freely rotatable about the shafts 7a and 7a' relative to the support ring 8a. The support ring 8a is directly mounted on the supporting base 10a.

Such an instrument might generally be described as a gyroscope G having three degrees of freedom. Assuming no friction in the bearings of the shafts 5a and 5a', 7a and 7a', unless an external torque is applied to the gyroscope G, the angular momentum of the rotor of gyroscope G remains constant, and the direction of the gyro spin axis, i.e. the direction of the vector H of the angular momentum relative to inertial space remains fixed, in accordance with Newton's law of conservation of angular momentum. A straight line a extends from the center 0 of the gyro in the direction of the vector H, and another straight ON is drawn through the center O of the gyro in a horizontal plane parallel with the meridian. B indicates a point on line ON. Two points E and W are taken on a straight line b which is perpendicular to the straight line ON and intersects it at point B in the horizontal plane. Straight lines c and d are drawn vertically from the points E and W and perpendicularly from the line b, and points E' and W' lie on a line such that a segment E'W' is parallel with segment EW. The point at which the straight line a intersects a plane defined by points EWW'E' is identified as S. A perpendicular is dropped from the point S to the segment EW and the point of intersection is designated A. The angle $\theta$ is between the segments OA and OS. The angle $\phi$ is between OB and OA. When the gyro is not at a high latitude, the point S travels as a function of time in the plane EWW'E' as indicated by the broken line i. This is true because the segment OS corresponds to the direction of the gyro-spin axis and hence is fixed relative to inertial space, while the plane EWW'E' is fixed relative to the earth and hence rotates with the earth. A straight line e is drawn from the center O of the gyro case 4a parallel to the axis of rotation of the earth and the point of intersection of line e with the plane EWW'E' is designated point P. The point P lies in a straight line f which intersects the segment EW at point B at right angles. The angle BOP is the latitude of the location of the gyro. The line OS corresponds to the gyro-spin axis and hence is fixed relative to space as described above. If the plane EWW'E' is fixed relative to earth, it moves relative to inertial space as the earth rotates. Thus, the segment OS moves in a conical motion about the segment OP and the locus of the point S on the plane EWW'E' is an ellipse. The point S rotates about the point P as indicated by the broken line i and the angle SOP remains constant. The period of rotation of the point S is approximately 24 hours due to the period of rotation of the earth.

In this system a device capable of controlling the gyro continuously to hold the point S at the point P will provide a method for continuously and accurately indicating the latitude and the azimuth of an observer at any place on earth. These may be obtained by measuring the angle POB and the direction of the segment OB.

A description will be given of the concept on which this invention is based which is to control a gyro in a manner quite different from that of conventional gyrocompasses. When the point S is displaced to the east (in the direction of the segment EE' in FIG. 1) away from the line f, the angle $\theta$ continuously increases. When the point S is displaced to the west (in the direction of the segment WW' in FIG. 1) away from the line f, the angle $\theta$ always decreases. The method of control of the gyro in this invention include (i) means for producing the time differential $\dot{\theta}$ of the angle $\theta$ and (ii) means for applying a torque substantially proportional to $\dot{\theta}$ to the gyro about the horizontal axis thereof along which the shafts 7a and 7a' extend. When $\dot{\theta}$ is positive indicating that the angle $\theta$ is increasing, the control torque is applied to the gyro about the shafts 7a and 7a' so that the gyro-spin axis precesses counterclockwise as viewed from above in FIG. 1 to cause a decrease in the angle BOA ($\phi$). When $\dot{\theta}$ is negative indicating that the angle $\theta$ is decreasing, the control torque is applied to the gyro so that the gyro-spin axis precesses in a clockwise direction to cause a decrease in $\phi$. The operation will now be described in more detail. When the differentiated value $\dot{\theta}$ of the angle $\theta$ is positive, the point S lies further to the east than the line f, as may be seen from FIG. 1. In this condition, if a torque having a clockwise turning moment about the shafts 7a and 7a' (viewed from the shaft 7a' to the shaft 7a) is applied to the gyro, the precession caused in the gyro tends to direct the point S to the line f in a direction indicated by arrows a1 in FIG. 1. As a result, the point S does not move freely on its locus i but draws a locus directed toward the line f as indicated by $i_1$. When the point S passes across the line f it turns about the point P and moves down due to the rotation of the earth. Simultaneously with the descent of the point S, a torque substantially proportional to the differentiated value $\dot{\theta}$ begins to act about the horizontal shafts 7a and 7a'. This torque has a clockwise turning moment about the shafts 7a and 7a' (as viewed from the shaft 7a to the shaft 7a'). This torque produces precession in the gyro and the point S is again caused to approach the line f in the direction indicated by arrows $a_2$ in FIG. 1. Thus, in the case of an uncontrolled gyro, the point S performs undamped periodic motion and moves on the broken-lined locus i but in this invention a torque substantially proportional to the time differential ($\dot{\theta}$) of the angle $\theta$ is applied to the gyro about the shafts 7a and 7a' as previously described, so that the point S coincides with point P after following the spiral locus $i_1$ in a damped periodic motion. With an increase in an approximate proportional constant for the torque which is substantially proportional to the value $\dot{\theta}$ or with a proportional constant for the torque exactly proportional to $\dot{\theta}$, the motion of point S becomes gradually non-oscillatory and finally substantially straight as indicated by a solid line $i_2$, which will cause point S to reach point P in a substantially straight line. Thus, when the periodic motion has a period of approximately 24 hours, the point S can be brought to the point P within several hours regardless of where the point S happens to be.

Thus, this system enables simultaneous detection and indication of the latitude and the meridian respectively. It is to be understood that the above-described concept and instrument have not previously been employed in conventional gyrocompasses and inertial navigation systems.

It will be apparent from the above description that the gyro-spin axis is maintained parallel with the axis of the earth's rotation at any location on earth. The longitude detecting system detects the angular velocity of the gyro case about the rotor spin axis with another gyro and an accelerometer. The angular velocity component due to the earth's rotation is subtracted from the detected angular velocity of the gyro case to obtain the angular velocity due to the speed of the craft in the east-west direction and the difference is integrated to obtain the longitude change corresponding to the location of the craft.

An exemplary instrument embodying the principles of this invention is shown in FIG. 2, which shows the construction of the instrument. Reference numerals 1 and 1' indicate bearing mounts which are fixedly mounted on a ship and aligned with the ship's heading. A servo motor 2 and a roll angle transmitter synchro 3 are secured to the bearing stand 1. Reference numeral 4 designates a roll gimbal having a pair of roll shafts 5 and 5' which extend in the direction of the ship's heading. Roll shafts 5 and 5' are respectively supported by bearings (not shown) mounted in the bearing stands 1 and 1'. One roll shaft 5 has affixed at its free end a roll gear 6 which meshes with gears respectively affixed to the servo motor 2 and the roll angle transmitter synchro 3. Bearings 7 and 7' for pitch shafts 9 and 9' are provided on the roll gimbal 4 at positions perpendicular to the roll shafts 5 and 5' and a pitch follower base 10 is mounted on the roll gimbal at one end of the pitch shaft 9.

On the pitch follower base 10 are mounted a pitch servo motor 11, a pitch angle transmitter synchro 12 and a secant generator 13. The secant generator 13 is optional. A pitch gimbal 8 is supported by pitch shafts 9 and 9'. One shaft 9 has a pitch gear 14 at one end. The pitch gear 14 meshes with gears of the pitch servo motor 11, the pitch angle transmitter synchro 12 and the secant generator 13 on the pitch follower base 10. The pitch gimbal 8 has azimuth follower shaft bearings 15 and 15' mounted perpendicular to the pitch shafts 9 and 9'. In the vicinity of the bearing 15 of the pitch gimbal 8 an azimuth follower base 16 is provided and an azimuth servo motor 17, an azimuth transmitter synchro 19 and an azimuth resolver 18 having a sine output part 18a and a cosine output part 18b are mounted on base 16. An azimuth gimbal 21 has a pair of azimuth shafts 22 and 22' which extend perpendicular thereto. These azimuth shafts 22 and 22' are respectively supported by bearings 15 and 15' mounted in the pitch gimbal 8. The one azimuth shaft 22 has an azimuth gear 20 affixed to its one end, which meshes with gears of the azimuth servo motor 17, azimuth resolver 18 and azimuth transmitter synchro 19. The azimuth gimbal 21 has latitude follower shaft bearings 23 and 23' at positions perpendicular to the azimuth shafts 22 and 22'. A latitude follower base 24 is attached to gimbal 21 and carries a latitude servo motor 27, a latitude resolver 25 and a latitude transmitter synchro 26.

The gyro platform 28 is shown to be ring-shaped, for example, but it may also be in the form of a plate. The gyro platform 28 has a pair of latitude shafts 29 and 29' which extend in the east-west direction and which are respectively rotatably supported by bearings 23 and 23' mounted in the azimuth gimbal 21.

A gimbal ring 34 has first shafts 35 and 35' which are coaxial with or parallel to the latitude shafts 29 and 29' of the platform 28 and are rotatable about the shafts 29 and 29'. The gimbal ring 34 rotatably supports second shafts 38 and 38' secured to a gyro case 39 which has incorporated therein a gyro rotor in such a manner that its spin axis may cross the axis of shafts 35 and 35'. Reference numerals 40 and 41 represent contactless deviation detecting devices or pick offs, which respectively detect angular deviation of the gyro case 39 about the second shafts 38 and 38' and that of the gimbal ring 34 about the first shafts 35 and 35'. Reference numerals 36 and 37 designate torquers, by means of which torques are respectively generated about the second and first shafts 38, 38' and 35, 35' in a contactless manner. The spin axis of the gyro rotor housed in the gyro case 39 is perpendicular to the second shafts and normally perpendicular to the first shafts 38, 38'. The elements 34, 35, 35', 38, 38', 39, 40, 41, 36 and 37 make up a latitude gyro 32. The term "normally" here refers to the settled condition of the latitude gyro when its spin axis is parallel to the earth's axis and the pick-offs 40 and 41 are in their null signal condition.

Reference numeral 33 indicates a longitude gyro which comprises a gimbal ring 50 provided with first shaft 43 and 43' mounted parallel to normal direction of the spin axis of the gyro rotor of the latitude gyro 32 and having rotational freedom about the shafts 43 and 43', and a gyro case 49 which contains a gyro rotor. Second shafts 46 and 46' are secured to the gyro case 49 and are perpendicular to the spin axis of the gyro rotor housed in the gyro case 49 and to the first shafts 43 and 43'. The second shafts 46 and 46' are rotatably supported by the gimbal ring 50. A second contactless deviation detecting device 47 is mounted for detecting the angular deviation of the gyro case 49 about the second shaft 46 and 46' relative to the gimbal ring 50. A first contactless deviation detecting device 48 is mounted for detecting the angular deviation of the gimbal ring 50 about the first shafts 43 and 43' relative to a base 28' (which is shown in the form of a ring but need not be limited specifically thereto and may take the form of a case). Ring 28' is fixed with respect to the platform or ring 28. Torquers 45 and 44 apply torque respectively about the first and second shafts 43, 43' and 46, 46' in a contactless manner. The base 28' rotatably supports the first shafts 43 and 43' and the base 28' is secured to the gyro platform 28 in such a manner that the first shafts 43 and 43' are parallel to the normal direction of the spin axis of the latitude gyro 32.

A latitude gear 30 is secured to the gyro platform 28 coaxially with latitude shaft 29 and is coupled to the gear system of the latitude servo motor 27, the latitude resolver 25 and the latitude transmitter synchro 26 of the latitude follower base 24. The gyro platform 28 has a gear 31 coaxial with the latitude shaft 29' on the side opposite from the latitude gear 30.

Reference numeral 51 designates an accelerometer platform, which is rotatably mounted on the latitude shaft 29'. The accelerometer platform 51 supports an east-west accelerometer 53 having an acceleration sensing axis parallel with the latitude shaft 29' and a north-south accelerometer 52 having an acceleration sensing axis perpendicular to the latitude shaft 29'. A servo motor 55 has an output gear 31' which meshes with gear 31. An angular deviation detecting device 54 detects relative tilt angular deviation between the accelerometer platform 51 and the azimuth gimbal 21 in a contactless manner.

In FIG. 2, reference numerals 58 and 58' indicate integrators, an attenuator 59, an adder 60 and a signal generator 61.

FIGS. 3A, 3B and 3C are block diagrams for explaining the operation of the follower device of the instrument exemplified in FIG. 2. An apparatus for insulating the gyro platform 28 and the accelerometer platform 51 from the motion of the craft consists of the contactless deviation detecting devices 54, 40 and 48, the follower servo motors 11, 2 and 17 for generating practical torques, the azimuth resolver 18 and the latitude resolver 25.

For reasons described later the gyro platform 28 deviates from the azimuth gimbal 21 by an angle equal to the latitude of the present location of the ship and the latitude shafts 29 and 29' rest in the east-west direction at that location. The roll shafts 5 and 5' and the pitch shafts 9 and 9' are fixed in azimuth relative to the ship so that the relationship in position between the contactless deviation detecting devices 54, 40 and 48 and the roll, pitch and azimuth shafts 5 and 5', 9 and 9', 22 and 22' generally varies relative to space. This necessitates a conversion of coordinates of the detected signal for each follower shaft. Angular deviation signals are converted into corresponding electric signals by the contactless deviation detecting devices 54, 40 and 48 and are respectively applied to the resolvers 18 and 25. As is well-known in the art, when supplied with an input signal, a resolver produces two signals proportional to the sine and cosine of the rotational angle of the rotor. In the present invention, when the instrument of FIG. 2 is at a standstill, the angular positions of the rotors of the resolvers 18 and 25 respectively coincide with the azimuth and the angle of the latitude of the location of the ship. The outputs of the resolvers 18 and 25 of FIG. 3C include the sine and cosine of the rotational angles of the rotors and are respectively representative of signals multiplied by the sine and cosine of the inputs.

The input to the roll servo motor 2 is produced by the following operation. The output of the contactless deviation detecting device 54 is applied to the azimuth resolver 18. Further, the outputs of the deviation detecting devices 40 and 48 are respectively applied to latitude resolver 25. The sine output of the latitude resolver part 25a and the cosine output of the latitude resolver part 25b are added together by an adder 65 and the resulting output is applied to an azimuth resolver 18. The cosine output of the azimuth resolver part 18b and the sine output of the azimuth resolver part 18a are added together by an adder 66 and the resulting output is fed to the secant generator 13 and its output is applied as an input signal to the roll servo motor 2. The secant generator 13 produces an output so that the secant (1/cosine) of the pitch angle of the ship is multiplied by the input signal when the instrument of FIG. 2 is at a standstill. In other words, the secant generator 13 has the object to enhance the characteristic of the roll servo system by adjusting the gain of the servo system in response to the secant of the pitch angle but the secant generator 13 is optional. The pitch servo motor 11 is supplied with an input signal comprising the cosine output of the azimuth resolver part 18a added to the sine output of the azimuth resolver part 18b by an adder 67. In a similar manner, the azimuth servo motor 17 is supplied with an input signal comprising the sine output of the latitude resolver part 25b added with the cosine output of the latitude resolver part 25a in an adder 68. Resolver parts 18a, 18b, 25a and 25b are described, while in FIG. 2 only the two resolvers 18 and 25 are shown for the sake of brevity. In practice, the two pairs of resolver parts 18a, 18b and 25a, 25b are employed as depicted in FIG. 3C, which illustrates the operation for converting the coordinates of the signals.

FIG. 3A shows a follow-up system for the gyro platform 28 about the latitude shafts 29 and 29'. In the event that deviation exists in the relative angular position of the gyro platform 28 to the gimbal ring 34 about the first shafts 35 and 35' due to the motion of the ship or the motion of the latitude gyro 32 relative to the earth, the deviation is converted by the contactless deviation detecting device 41 into a corresponding electric signal and the resulting signal is applied through, for example, an amplifier 41' to the latitude servo motor 27 to drive it in a manner to reduce the signal to zero.

FIG. 3B shows a system for restricting the motion of the longitude gyro 33 about the second shafts 46 and 46' to the platform 28. When a deviation in the relative angular position of the longitude gyro 33 and the gyro platform 28 about the second shafts 46 and 46' occurs due to the motion of the ship or the motion of the longitude gyro 33 relative to the earth, the deviation is converted by the contactless deviation detecting device 47 into a corresponding electric signal and the resulting signal is supplied through, for example, an amplifier 47' to the torquer 45 to cause the longitude gyro 33 to precess about the second shafts 46 and 46' in such a manner as to reduce the signal to zero.

Figure 5:
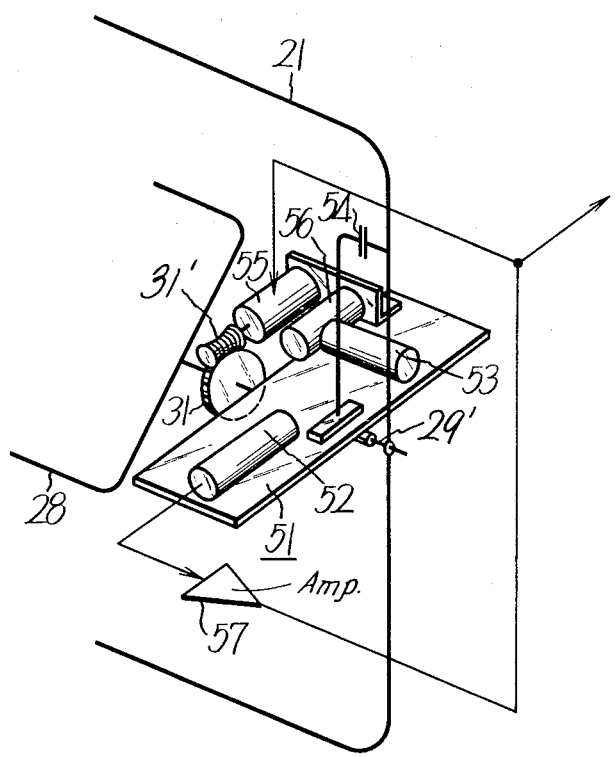
FIG. 5 is a detail schematic diagram showing one portion of the instrument depicted in FIG. 2.

FIG. 5 illustrates the accelerometer platform 51, the elements disposed in the vicinity thereof and is a simplified connection diagram. This device derives a signal from an amplifier 57 which corresponds to the time differential of the deviation angle of the spin axis of the latitude gyro 32 relative to the horizontal plane. As previously described relative to FIG. 3, the gyro platform 28 follows the motion of the latitude gyro 32 about the shafts 29 and 29' and the platform 28 moves in exactly the same manner as the latitude gyro 32.

Assume that the spin axis of the latitude gyro 32 depicted in FIG. 2 points to the point S of FIG. 1 and that the accelerometer platform 51 is horizontal. Due to the rotation of the earth the gyro changes its position to follow the broken line i in FIG. 1, so that the angle of the spin axis of the latitude gyro 32 relative to the horizontal plane, that is, the angle $\theta$ in FIG. 1 gradually increases. This change in position is detected and a servo device causes the gyro platform 28 to turn about the latitude shafts 29 and 29'. The shafts 29 and 29' and the accelerometer platform 51 are interlocked by the gear 31 and a worm 31', so that the accelerometer platform 51 starts to turn together with the latitude shafts 29 and 29'. This inclination is immediately detected by the accelerometer 52 and is converted into a corresponding electrical signal and the resulting signal is applied through the amplifier 57 to the servo motor 55 to turn the accelerometer platform 51 with respect to the gyro platform 28 to its initial horizontal position. The accelerometer platform 51 can operate as a servo system for the accelerometer 52 by turning it about the shafts 29 and 29' in such a manner that the accelerometer 52 may be always horizontal and does not produce any output with respect to changes in position of the latitude gyro 32 relative to the earth. In order to improve the characteristics of this servo system, it is possible to mesh a gear of a tachogenerator 56 with the gear train of the servo motor 55 to apply the output of the tacho-generator 56 to the servo motor 55 as illustrated in FIG. 4A and thus provide rate feedback. Consequently, the revolving speed of the servo motor 55 will be proportional to the time-differentiated value $\dot{\theta}$ of the angle $\theta$ and to the error voltage applied to the motor. Thus the output of the amplifier 57 is substantially proportional to $\dot{\theta}$. When the angle $\theta$ varies with the change of the latitude gyro 32 in position, if the speed of the servo motor 55 is lower than an optimum value, the accelerometer 52 tilts in the same direction as the gyro so that the output of the accelerometer 52 increases to drive the servo motor 55 at higher speed. When the servo motor 55 is driven at an optimum speed to agree with $\dot{\theta}$, the output of the amplifier 57 also becomes proportional to $\dot{\theta}$. In such a case, by the addition of the output signal of the amplifier 57 to the torquer 37 of the latitude gyro 32, the spin axis of the latitude gyro 32 comes to rest parallel with the axis of the earth's rotation (refer to FIG. 4A) as described relative to FIG. 1. The time in which the spin axis of the latitude gyro 32 comes to rest can be shortened by also applying one portion of the output signal of the amplifier 57 to the torquer 36 to cause the latitude gyro 32 to precess about the latitude shafts 29 and 29' in response to the differentiated value $\dot{\theta}$ of the angle $\theta$. For these purposes the signals to torquers 36 and 37 may be taken from accelerometer 52 through a separate amplifier 69 as shown in FIG. 2 or from amplifier 57 as shown in FIG. 4A. Further, if the gain of the amplifier 57 is selected to be large, the servo motor 55 can be driven by the minimum output of the accelerometer 52 corresponding to $\dot{\theta}$ and in such a case the accelerometer platform 51 remains horizontal with high precision. Consequently, the azimuth gimbal 21 can be always held vertical by making it follow the accelerometer platform 51 with the output of the contactless deviation detecting device provided between the accelerometer platform 51 and the azimuth gimbal 21 through the use of the servo system as described relative to FIG. 3.

The above description relates to the case where the instrument of the invention is at standstill on the earth's surface. A description will now be given of the operation of the instrument of this invention mounted on a ship under way. The north-south component of the speed of the ship will hereinafter be indicated by $V_{NS}$. As previously described with FIGS. 2 and 5, the system comprising the accelerometer platform 51, the north-south accelerometer 52, the amplifier 57 and the servo motor 55 constitutes a $\theta$ generator, which generates a signal corresponding to the time-differential of the angle of the spin axis of the latitude gyro 32 relative to the horizontal plane which is a plane perpendicular to the gravity vector. In the above description wherein the ship stands still and the spin axis of the latitude gyro 32 varies relative to the vector of gravity the direction of the vector of gravity does not change but even if, for example, the spin axis of the latitude gyro 32 stands still and is settled parallel with the axis of the earth's rotation, when the ship sails in the north-south direction the vector of gravity continuously changes its direction, so that the $\theta$ generator produces an output corresponding thereto. In the event that the ship sails, for example, northward, the spin axis of the latitude gyro 32 tends to point parallel to the axis of the earth's rotation at all times due to the property of a gyro to maintain its spin axis in the meridian plane, and accordingly the apparent tilt angle of the spin axis of the gyro relative to the horizontal plane increases. As a result, the north side of the accelerometer platform 51 also rises but this tilt is detected by the north-south accelerometer 52 and its output is applied through the amplifier 57 to the servo motor 55 to hold the platform 51 horizontal. Accordingly, so long as the ship sails in the north-south direction, the accelerometer platform 51 is required to continuously turn about the latitude shafts 29 and 29' at an angular velocity of $V_{NS}/R$ where R is the radius of of the earth relative to the gyro platform 28. To accomplish this it is necessary to supply the servo motor 55 with a voltage corresponding to the angular velocity $V_{NS}/R$. This is accomplished by applying the required additional voltage to the servo motor 55 from the amplifier 57 as above described. At the same time, the latitude gyro 32 is also supplied with the same voltage at the torquer 37 from the amplifier 57 or the amplifier 69. As a result of the application of the voltage to the torquer 37, the gyro 32 precesses about the shafts 38 and 38' and hence does not agree with the axis of the earth's rotation but rests at a very small angle of azimuth thereto, introducing an error in the detection of the latitude. As will be apparent from the foregoing, this error is caused by the fact that the $\theta$ generator detects $\overline{V_{NS}}$ and it is necessary to correct the error with a speed signal obtained from a log (speedometer) or other device. This may be accomplished with a north-south speed signal $V_{NS}$ detected as above described which is applied to the amplifier 57 together with a signal from the north-south accelerometer 52. Thus, the accelerometer platform 51 is turned about the latitude shafts 29 and 29' at an angular velocity equal to $V_{NS}/R$ while being held horizontal. Accordingly, the output due to the north-south accelerometer of the ship, i.e. the output due to the change of the vector of gravity from the north-south accelerometer, becomes zero so that the north-south accelerometer 52 produces only an output based on the time differential of the tilt angle of the latitude gyro 32 and the latitude gyro 32 coincides with the axis of the earth's rotation independently of the speed of the ship.

If the latitude shafts 29 and 29' are always held horizontal, the azimuth shafts 22 and 22' and the azimuth ring 21 are maintained vertical for the above reasons and the gyro platform 28 is caused by the latitude follower systems 41 and 27 to always correspond in tilt to the latitude gyro 32 and rests perpendicular to the axis of the earht's rotation, so that the latitude shafts 29 and 29' remain in the east-west direction at the position of the ship. Consequently, the azimuth gimbal 21 can be utilized as an azimuth reference. The angle of intersection of the gyro platform 28 with the azimuth gimbal 21 represents the latitude of the ship. This may be picked off by the latitude transmitter synchro 26. Since the azimuth gimbal 21 is vertical, the relative angle about the pitch shafts 9 and 9' to the roll gimbal 4 represents the pitch angle of the ship, while the relative angle about the roll shafts 5 and 5' of the roll follower base 1 indicates the roll angle of the ship. These angles may be picked off from the roll and pitch angle transmitter synchros 3 and 12 as electrical signals. Scale dials for indicating the roll and pitch angles can be provided and these angles can be directly read out against the scales.

A description will be given of control systems for the longitude gyro 33. The system for controlling the gyro 33 about the first shafts 43 and 43' is of prime importance. The control system of the gyro about the second shafts 46 and 46' may merely cause the motion of the gyro 33 to follow that of the latitude gyro 32 about the second shafts 38 and 38' as depicted in FIG. 3B. The method for controlling the motion of the longitude gyro 33 about the first shafts 43 and 43' will be described with reference to FIG. 4B. The first shafts 43 and 43' have their axes fixed parallel with the normal direction of the spin axis of the latitude gyro 32 and, after the instrument has come to rest, they are parallel with the axis of the earth's rotation. Let it be assumed that the shafts 43 and 43' are parallel with the axis of the earth's rotation and that the spin axis of the longitude gyro 33 lies in the east-west or horizontal direction. Under these conditions, the spin vector arrow of the spin axis (FIG. 2) at the west side of the spin axis of the longitude gyro 33 drops below the horizontal plane by turning about the first shafts 43 and 43' due to the influence of the rotation of the earth and the gyro action of the longitude gyro 33. With the servo system, the latitude shafts 29 and 29' also perform the same motion, so that the accelerometer platform 51 on the latitude shafts 29 and 29' also tilts about the shafts 43 and 43' relative to the horizontal plane. This inclination is detected by the east-west accelerometer 53. The detected signal is applied to the torquer 44 of the longitude gyro 33 through the integrator 58 and the attenuator 59 which has an attenuation factor proportional to the secant of the latitude thus causing precession in the longitude gyro 33 to restore its spin axis to its horizontal position. Since the angular velocity of the earth's rotation is constant regardless of the latitude of the location of the ship, the precision of the above system can be enhanced by superimposing a constant input on the input to the torquer to cause the longitude gyro 33 to precess about the shafts 43 and 43' at the angular velocity of the earth's rotation at all times. The signal generator 61 supplies this signal.

The control of motion about the shafts 43 and 43' is accomplished with a servo system designed for holding the spin axis of the longitude gyro 33 horizontal at all times and the signal generator 61 is to apply bias to this system. The signal generator 61 generates a voltage signal which is applied to the torquer 44 so as to cause the spin axis of the longitude gyro 33 to precess about the first shafts 43 and 43' at an angular velocity equal to that of the earth's rotation, and the signal of the generator 61 and the output of the attenuator 59 are applied to, for example, the adder 60. The output of the adder is then fed to the torquer 44 to supply the longitude gyro 33 with a desired torque. This system is an oscillatory system which can be constructed by selecting the constants for respective parts of the loop to provide the so-called Schüler pendulum having a period of 84 minutes. It will be seen that this holds the spin axis of the longitude gyro 33 horizontal as well as the latitude shafts 29 and 29' even when the ship is being accelerated and the output of the integrator 58 of the east-west accelerometer 53 represents the speed of the ship in the east-west direction.

Further, the longitude can be obtained by integrating the output of the attenuator 59 through the integrator 58' as depicted in FIG. 4B.

Although the foregoing description has been made in connection with an embodiment which uses the so-called tow-degree-of-freedom gyros which have two detecting shafts in addition to the gyro-spin axis for the latitude and longitude gyros, it is also possible for the gyro platform 28 to be replaced with a combination of the three single-degree-of-freedom gyros each having only one input axis.

Figure 6:
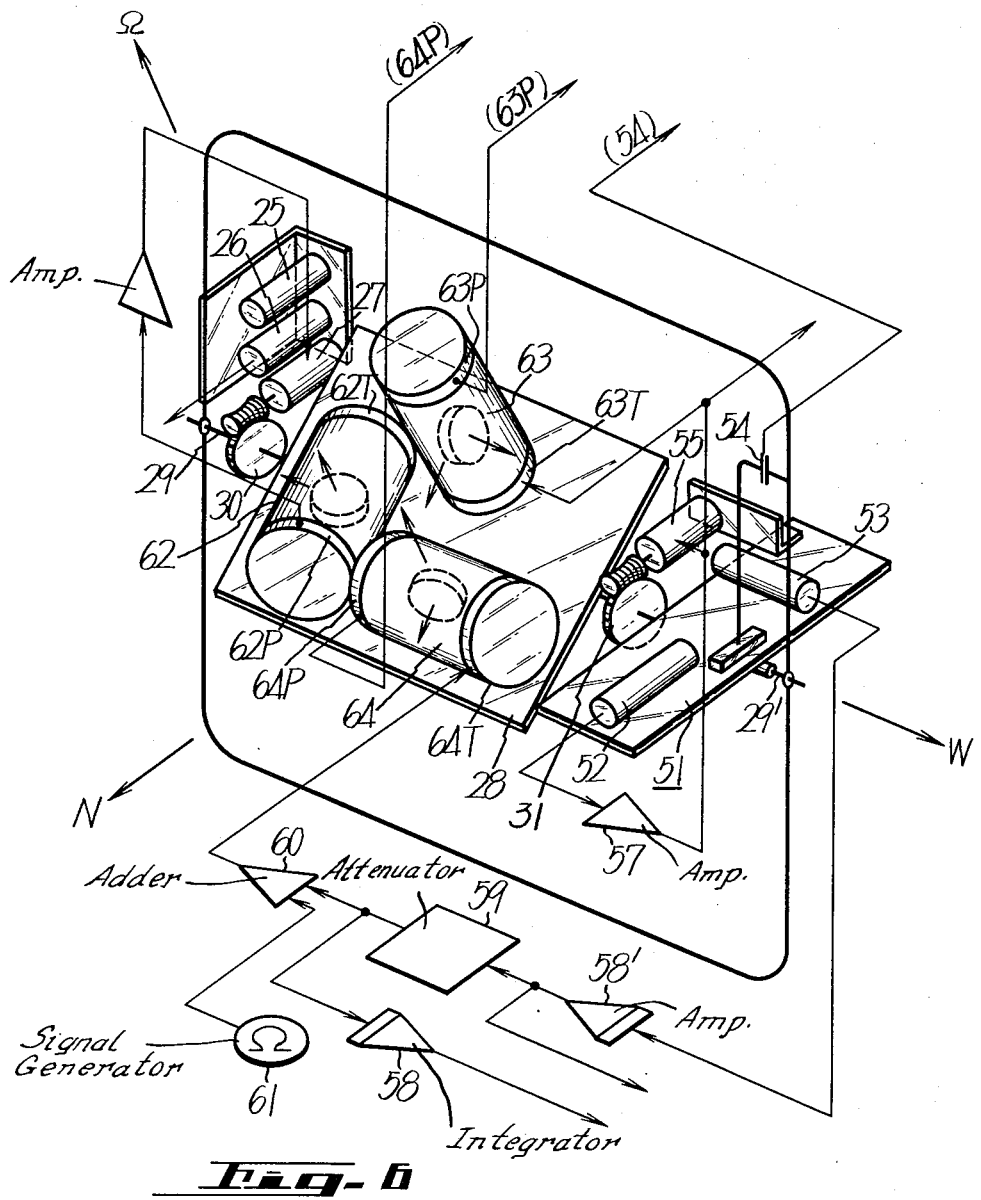
FIG. 6 is a schematic diagram illustrating a modified form of one portion of the instrument of this invention.

In FIG. 6 there is illustrated one example employing single degree-of-freedom gyros in which the same reference numerals as those in FIG. 2 indicate the same elements. In the illustrated example three single-degree-of-freedom gyros 62, 63 and 64 are substituted for the two two-degree-of-freedom gyros of the gyro platform 28 of FIG. 2 and the roll, pitch and azimuth follower systems are omitted. Characters P and T suffixed to the reference numerals respectively represent deviation detecting devices and torquers. Reference numeral 62 indicates a latitude gyro, 63 an azimuth gyro and 64 a longitude gyro. Reference numerals 63P and 64P respectively correspond to the deviation detecting devices 40 and 48 shown in FIG. 2 and, in addition, a deviation detecting device 54 is provided. Their outputs are applied to the servo motors 2, 11 and 17 after conversion of the coordinates by the resolvers depicted in FIG. 3C. The output of the amplifier 57 is applied to the servo motor 55 and, at the same time, to a torquer 63T of the azimuth gyro 63 to cause the platform 28 to rest at right angles to the axis of the earth's rotation. This example is different from that of FIG. 2 in that in this case the output of the final-stage amplifier 60 is supplied to a torquer 64P of the longitude gyro 64. The details of a single-degree-of-freedom gyro are well known in the art and are not directly related to the principles of this invention and a detailed description will not be given. The gyros 62 and 63 correspond to the latitude gyro 32 of FIG. 2 and the gyro 64 corresponds to the longitude gyro 33.

It is possible, of course, to employ a two-degree-of-freedom gyro as the latitude gyro 32 and a single-degree-of-freedom gyro as the longitude gyro 33.

Further, even if the two detecting shafts 38, 38' and 35, 35' of the two-degree-of-freedom gyro, for example, the latitude gyro 32 are exchanged in position, the function of the gyro does not change. Accordingly, the particular arrangement of these shafts in the foregoing examples should not be construed as limiting this invention.

As will be seen, the gyroscopic instrument of this invention is capable of positive detection of the azimuth, latitude and longitude with high accuracy and, in addition, this instrument is relatively simple in construction and is very inexpensive to produce.

Further, the gyroscopic instrument of this invention enables simultaneous detection of the roll and pitch angles of the ship and its speed in the east-west directions.

It will be apparent that many modifications and variations may be effected without departing from the scope of the novel concepts of this invention.

I claim:

1. A gyroscopic instrument comprising:

a pair of roll bearing stands having a roll servo motor, a roll synchro and a pair of roll bearings, a roll gimbal having a pair of roll shafts rotatably supported by said roll bearing in said roll bearing stands, one of said roll shafts carrying a roll gear in mesh with said roll servo motor and said roll synchro, a pair of pitch bearings located on said roll gimbal substantially perpendicular to said roll shafts, a pitch follower base supported on said roll gimbal at said bearings and having mounted thereon a pitch servo motor and a pitch synchro;

a pitch gimbal having a pair of pitch shafts rotatably supported by said pitch bearings, one of said pitch shafts carrying a pitch gear in mesh with said pitch servo motor and said pitch synchro, a pair of azimuth bearings located on said pitch gimbal substantially perpendicular to said pitch shafts and an azimuth follower base supported on said pitch gimbal at said bearings and having mounted thereon an azimuth servo motor, an azimuth synchro and an azimuth resolver which has sine and cosine output parts;

an azimuth gimbal having a pair of azimuth shafts rotatably supported by said azimuth bearings, a pair of latitude bearings on said azimuth gimbal substantially perpendicular to said azimuth shafts and a latitude follower base supported on said azimuth gimbal at said bearings and having supported thereon a latitude servo motor, a latitude synchro and a latitude resolver which has sine and cosine output parts;

a gyro platform having a pair of latitude shafts rotatably supported by said latitude bearings, a latitude gear mounted on one of said latitude shafts and in mesh with said latitude servo motor, latitude synchro and latitude resolver;

a latitude gyro mounted with its spin axis normally perpendicular to said latitude shafts and including a first input axis parallel to said latitude shafts and with a first torquer and a first pick-off and a second input axis perpendicular to said spin axis and said first input axis and with a second torquer and a second pick-off, a longitude gyro with its spin axis normally parallel to said latitude shafts, a third input axis parallel to the normal direction of said spin axis of said latitude gyro and including a third torquer and a third pick-off and a fourth input axis perpendicular to said spin axis of said longitude gyro and said third input axis and with a fourth torquer and a fourth pick-off;

an accelerometer platform rotatably supported by one of said latitude shafts and having a first accelerometer with its input axis perpendicular to said latitude shafts and a second accelerometer with its input axis parallel to said latitude axis, an accelerometer platform servo motor and a gear in mesh with said accelerometer platform servo motor and mounted on said one of said latitude shafts;

an accelerometer platform pick-off consisting of an element attached to said azimuth gimbal and an element mounted on said accelerometer platform for detecting angular deviation of said platform from said azimuth gimbal about said latitude shafts;

means for supplying an output from said first pick-off to said latitude servo motor;

means for applying an output from said fourth pick-off to said third torquer;

means for applying an output from said accelerometer platform pick-off to said azimuth resolver;

means for applying an output from said second pick-off to said latitude resolver;

means for applying an output from said third pick-off to said second latitude resolver;

means for applying a sine output from said latitude resolver and a cosine output from said latitude resolver to a first adder;

means for applying an output from said first adder to said azimuth resolver;

a second adder for adding a cosine output from said azimuth resolver to the sine output from said azimuth resolver;

means for supplying an output from said second adder to said roll servo motor;

a third adder for adding the cosine output from said azimuth resolver to the sine output from said azimuth resolver;

means for supplying an output from said third adder to said pitch servo motor;

a fourth adder for adding the cosine output from said latitude resolver to the sine output from said latitude resolver;

means for applying an output from said fourth adder to said azimuth servo motor;

means for applying an output from said first accelerometer to said first torquer and said accelerometer platform servo motor;

a first integrator supplied with an output from said second accelerometer;

a secant latitude attenuator supplied with an output from said integrator;

a fifth adder for adding an output from said secant latitude attenuator to a constant output from a generator;

means for applying an output from said fifth adder to said fourth torquer; and a second integrator supplied with the output from said secant latitude attenuator.

* * * * *